(12) United States Patent
Nakashima et al.

(10) Patent No.: US 7,515,035 B2
(45) Date of Patent: Apr. 7, 2009

(54) VEHICLE DOOR CONTROL SYSTEM AND METHOD

(75) Inventors: Kazuhiro Nakashima, Obu (JP); Ifushi Shimonomoto, Okazaki (JP)

(73) Assignee: Denso Corporation, Kariya (JP)

( * ) Notice: Subject to any disclaimer, the term of this patent is extended or adjusted under 35 U.S.C. 154(b) by 590 days.

(21) Appl. No.: 11/340,528

(22) Filed: Jan. 27, 2006

(65) Prior Publication Data

US 2006/0224290 A1    Oct. 5, 2006

(30) Foreign Application Priority Data

Mar. 30, 2005    (JP)    ............................. 2005-099330

(51) Int. Cl.
*B60R 25/00* (2006.01)
(52) U.S. Cl. ..................... 340/5.72; 180/289
(58) Field of Classification Search ............... 340/5.72, 340/5.7, 5.61–5.64, 5.31, 500–825, 426.36, 340/5.71; 70/237–260; 180/287–290; 701/49
See application file for complete search history.

(56) References Cited

U.S. PATENT DOCUMENTS

| | | | |
|---|---|---|---|
| 5,517,189 A | * | 5/1996 | Bachhuber et al. .......... 340/5.64 |
| 6,924,738 B2 | * | 8/2005 | Emmerling et al. ......... 340/505 |
| 2003/0095040 A1 | * | 5/2003 | Shimomura ............ 340/426.13 |
| 2004/0041693 A1 | * | 3/2004 | Matsubara et al. ......... 340/5.72 |
| 2004/0075532 A1 | * | 4/2004 | Ueda et al. ................. 340/5.72 |
| 2004/0130462 A1 | * | 7/2004 | Ueda et al. .................. 340/901 |
| 2004/0140892 A1 | * | 7/2004 | Hanood ...................... 340/511 |
| 2005/0162259 A1 | * | 7/2005 | Hotta et al. ............ 340/426.13 |

FOREIGN PATENT DOCUMENTS

JP    2000-104429    4/2000

* cited by examiner

*Primary Examiner*—Abul Azad
*Assistant Examiner*—Ryan W Sherwin
(74) *Attorney, Agent, or Firm*—Nixon & Vanderhye PC

(57) ABSTRACT

When a compartment internal transmitter of a vehicle-side unit transmits a request signal with vehicle doors opened, at least one of strength of the request signal and sensitivity of a hand-held device to receive the request signal are set at a level lower than a normal level. Thus, even when the vehicle doors are in an open state, a communication area of the compartment internal transmitter is prevented from being extended to cover the outside of the compartment. As a result, when the holder of the hand-held device operates any of the vehicle doors from a location outside the vehicle compartment, it is possible to avoid an erroneous assumption that the hand-held device is left behind in the vehicle compartment and to execute a sequence of consecutive operations.

10 Claims, 6 Drawing Sheets

VEHICLE DOOR CONTROL SYSTEM AND METHOD

CROSS REFERENCE TO RELATED APPLICATION

This application is based on and incorporates herein by reference Japanese Patent Application No. 2005-99330 filed on Mar. 30, 2005.

FIELD OF THE INVENTION

The present invention relates to a vehicle door control system and method for controlling each vehicle door by duplex communications between a hand-held device and a vehicle-side unit.

BACKGROUND OF THE INVENTION

A conventional vehicle door control system controls locked and unlocked states of every door of a vehicle in accordance with a result of collating identification (ID) codes through duplex communications between a hand-held electronic key serving as a hand-held device and a vehicle-side electronic unit. In this vehicle door control system, a predetermined communication area surrounding the vehicle is set and, in this communication area, a transmitter employed in the vehicle-side unit transmits a request signal typically at predetermined intervals. Thus, the conventional vehicle door control system monitors movements of the holder of the hand-held device as movements approaching the vehicle, getting on the vehicle and getting off from the vehicle.

When the holder of the hand-held device approaches the vehicle in order to get on the vehicle, for example, the holder of the hand-held device enters the predetermined communication area. At that time, the hand-held device transmits a response signal including an ID code to the vehicle-side unit in response to the request signal. The vehicle-side unit determines whether or not the ID code satisfies a predetermined relational condition typically by examining whether or not the ID code matches an ID code registered in advance in the vehicle-side unit. When the ID code satisfies the relational condition, a control signal is supplied to a door locking control device employed in the vehicle-side unit to put every door in an unlock standby state. With every door put in the unlock standby state and a hand of the holder of the hand-held device touching a door handle of any specific door, a touch sensor employed in the door locking control device detects the touch and the door locking control device unlocks the specific door to allow the holder of the hand-held device to enter the vehicle compartment.

In addition, when the holder of the hand-held device gets off from the vehicle through a door of the vehicle after turning off an engine, a communication area of the hand-held device moves from the compartment of the vehicle to the outside thereof. At that time, when a door locking switch provided at a location in close proximity to the door handle of the door is operated, the door is locked.

In accordance with the above conventional vehicle door control system, the holder of the hand-held device is capable of locking and unlocking every door of the vehicle without manually operating a hand-held device and, thus, enjoying enhanced user friendliness of the vehicle door control system.

When the holder of a hand-held device gets off from the vehicle and wants to lock every door of the vehicle, for example, the holder of a hand-held device operates an opening/closing switch included in the hand-held device as an opening/closing switch of the vehicle doors to drive the automatic opening/closing apparatus to close the vehicle doors, which were opened when the holder of the hand-held device got off from the vehicle. After that, the holder of the hand-held device operates a lock switch provided on a door of the vehicle in order to lock all the doors of the vehicle. In this way, the vehicle door control system and the automatic opening/closing apparatus operate independently of each other in spite of the fact that the controlled doors of the vehicle are doors common to the vehicle door control system and the automatic opening/closing apparatus.

To solve the above drawback, a vehicle door control system is proposed, which carries out a sequence of consecutive operations to drive the automatic opening/closing apparatus to close the doors employed in the vehicle and then lock the doors when triggered by an operation carried out by the user on the doors. That is, when an operation carried out by the user on the doors is detected with the doors opened, ID codes are collated with each other. When the result of the collation is an OK, an operation to close the doors and an operation to lock the doors are carried out in succession. Thus, the user need not carry out operations to close the doors employed in the vehicle and lock the vehicle doors at two stages. To be more specific, the user need not carry out an operation to automatically close the doors employed in the vehicle at a first stage and, then, carry out an operation to lock the vehicle doors at a second stage. As a result, the user can enjoy more user friendliness.

In addition, it is preferable to carry out a process in order to make sure that the hand-held device is not left behind in the compartment of the vehicle with all the vehicle doors put in a locked state in order to avoid the risk of leaving the hand-held device in the compartment due to the fact the user has forgotten to take along the hand-held device with the user when the user gets off from the vehicle. In order to carry out such a process, an internal transmitter provided in the compartment of the vehicle as a transmitter having a communication area covering only the compartment of the vehicle is driven to transmit a request signal. When a response signal is received from the hand-held device as a signal transmitted by the hand-held device in response to the request signal transmitted by the compartment internal transmitter, the vehicle door control system determines that the hand-held device has been left behind in the compartment of the vehicle. When a response signal is not received from the hand-held device, on the other hand, the vehicle door control system determines that the hand-held device has not been left behind in the compartment of the vehicle.

When the compartment internal transmitter transmits a request signal when the user operates a door employed in the vehicle with doors of the vehicle each put in an open state, however, it is likely that the communication area of the transmitted request signal is extended from the compartment internal area to also cover an area outside the compartment due to the fact that any of vehicle doors are in the open state. In this case, a response signal may be received from the hand-held device as a signal transmitted by the hand-held device in response to the request signal transmitted by the compartment internal transmitter in spite of the fact that the hand-held device is located outside the compartment of the vehicle. Since the vehicle door control system determines that the hand-held device has been left behind in the compartment of the vehicle in this case, however, the sequence of consecutive operations to drive the automatic opening/closing apparatus to close the doors employed in the vehicle and then lock the doors cannot be carried out.

SUMMARY OF THE INVENTION

It is thus an object of the present invention to provide a vehicle door control system and method capable of preventing duplex communications from being carried out between a compartment internal transmitter and a hand-held device located outside the compartment when the compartment internal transmitter transmits a request signal with vehicle doors each put in an open state, hence, being capable of smoothly carrying out the sequence of consecutive operations to drive the automatic opening/closing apparatus to close the doors employed in the vehicle and then lock the doors.

According to the present invention, a vehicle door control system comprises a hand-held device and a vehicle-side unit, which includes an external transmitter for transmitting a request signal to an outside of a compartment of the vehicle, an internal transmitter for transmitting another request signal to an inside of the compartment of the vehicle and an automatic door control section capable of automatically carrying out automatic door control operations. When a predetermined operation is performed on a vehicle door, the external transmitter and the internal transmitter transmit respective request signals to an outside and inside of the vehicle. The doors are not automatically closed or locked when the hand-held device responds to the request signal transmitted from the internal transmitter. In the case any door of the vehicle is open, strength of the request signal or sensitivity of the hand-held device is reduced to a lower level so that the hand-held device does not respond to the request signal transmitted from the internal transmitter through the open door.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

First Embodiment

Figure 1:
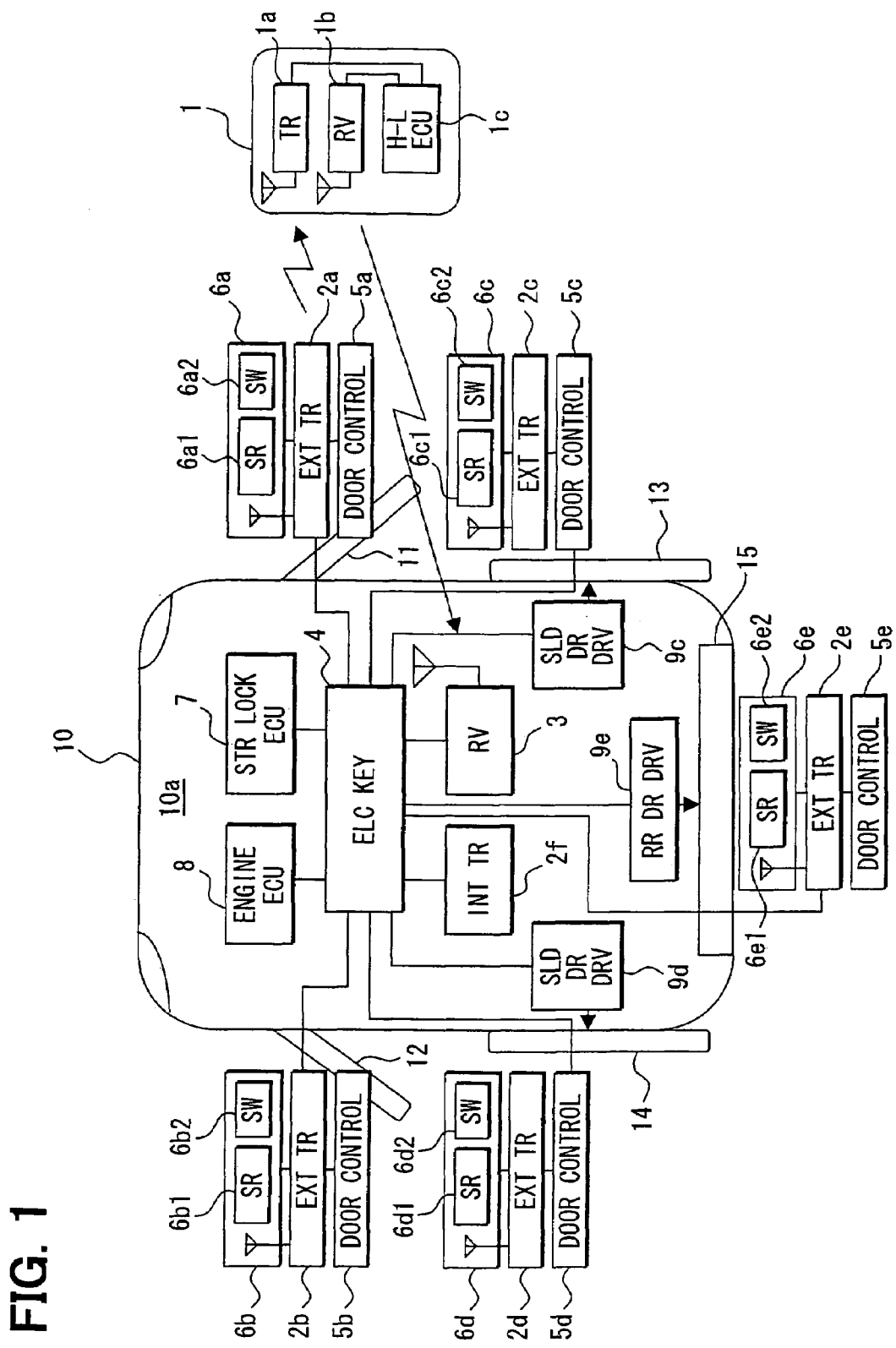
FIG. 1 is a block diagram showing a vehicle door control system according to an embodiment.

Referring to FIG. 1, a vehicle door control system is provided for a vehicle 10 and includes a hand-held device (electronic key) 1 and a vehicle-side unit 10a. The vehicle-side unit 10a employs an electronic control unit (ECU) 4 for a key to control lock and unlock states of every vehicle door 11 to 15, which are provided at each entrance into a vehicle compartment, on the basis of a result of collation of an ID code through duplex communications with the hand-held device 1. In addition, in order to enhance security of the vehicle 10, the electronic key ECU 4 also controls a steering lock state and a state of permitting or inhibiting the starting of an engine employed in the vehicle 10.

The hand-held device 1 has a receiver 1a for receiving request signals from compartment external transmitters 2a to 2e employed in the vehicle-side unit 10a as well as a request signal from a compartment internal transmitter 2f also employed in the vehicle-side unit 10a. The hand-held device 1 also has a transmitter 1b for transmitting a response signal including an identification (ID) code in response to a received request signal. In addition, the hand-held device 1 has a hand-held device ECU 1c connected to the receiver 1a and the transmitter 1b as an ECU for executing various kinds of control processing. More specifically, the hand-held device ECU 1c checks a signal received by the receiver 1a in order to determine whether or not the received signal is a request signal. When the received signal is a request signal, the hand-held device ECU 1c generates a response signal and drives the transmitter 1b to transmit the response signal to the vehicle-side unit 10a.

The compartment external transmitters 2a to 2e are provided on the respective vehicle doors 11 to 15 of the vehicle 10. The vehicle-side unit 10a employs the compartment internal transmitter 2f in addition to the compartment external transmitters 2a to 2e. The compartment external transmitters 2a to 2e and the compartment internal transmitter 2f each transmit a request signal in accordance with a transmission command signal received from the electronic key ECU 4, which serves as the principal component of the vehicle-side unit 10a.

It is to be noted that the vehicle doors 11 and 12 are hinge-type doors provided for the front seats of the vehicle 10. On the other hand, the vehicle doors 13 and 14 are slide-type doors provided for the rear seats of the vehicle 10. The slide-type vehicle door 13 has a slide door driving section 9c including a motor serving as a driving power source. Similarly, the slide-type vehicle door 14 has a slide-door driving section 9d including a motor serving as a driving-power source. The vehicle doors 13 and 14 of the slide type can be automatically opened and closed by the slide-door driving sections 9c and 9d respectively in accordance with an opening/closing signal generated by the electronic key ECU 4. The rear vehicle door 15 also has a rear-door driving section 9e including a motor serving as a driving-power source as the slide-door driving sections 9c and 9d do. In the same way, the rear vehicle door 15 can be automatically opened and closed by the rear-door driving section 9e in accordance with an opening/closing signal generated by the electronic key ECU 4. In many cases, the slide-type vehicle doors 13 and 14 as well as the rear door 15 are each a relatively heavy door. Thus, by providing the slide-type vehicle doors 13 and 14 as well as the rear door 15 with the respective slide-door driving sections 9c and 9d as well as the rear-door driving section 9e, which have functions to automatically close and open the slide-type vehicle doors 13 and 14 as well as the rear door 15 respectively, it is possible to reduce loads, which are to be borne by passengers when the passengers get on or get off the vehicle 10.

The distance that request signals transmitted by the compartment external transmitters 2a to 2e can reach is typically set at a value in the range 0.7 to 1.0 meters. Thus, when the vehicle 10 is put in a state of being parked, a communication area determined by this distance range is formed, surrounding each of the vehicle doors 11 to 15. As a result, one of the compartment external transmitters 2a to 2e will detect a movement made by the holder of the hand-held device 1 to approach the vehicle 10. On the other hand, a communication area of the compartment internal transmitter 2f is set to cover an area in the compartment of the vehicle 10 so as to make the compartment internal transmitter 2f being capable of determining whether the hand-held device 1 is placed at a location inside or outside the compartment of the vehicle 10. The compartment internal transmitter 2f may include a front seat transmitter that mainly covers a front seat area and a rear seat transmitter that mainly covers a rear seat area. If these two transmitters are used, the communication areas of the two transmitters are so set that the combined communication areas form an entire internal area of the vehicle compartment.

In addition, the vehicle-side unit 10a also includes a receiver 3 installed in the compartment of the vehicle 10 and put in a state of being capable of receiving a response signal from the hand-held device 1 in response to an operation carried out by the transmitters 2a to 2f to output a transmitted request signal. As a matter of fact, the receiver 3 is provided as a receiver dedicated to receive such a response signal. A response signal received by the receiver 3 is passed on to the electronic key ECU 4. On the basis of an ID code included in the response signal, the electronic key ECU 4 determines whether or not to execute control including control of a door lock/unlock state of each of the vehicle doors 11 to 15.

The vehicle-side unit 10a also includes door locking control sections 5a to 5e respectively on the vehicle doors 11 to 15 of the vehicle 10. The door locking control sections 5a to 5e are sections for locking or unlocking their respective vehicle doors 11 to 15. The door locking control sections 5a to 5e also change a locked state of the respective vehicle doors 11 to 15 to an unlock standby state allowing the vehicle doors 11 to 15 to be unlocked when the holder of the hand-held device 1 touches the door outside handle (door handle) 6 of any one of the respective vehicle doors 11 to 15. The door locking control sections 5a to 5e each operate in accordance with a command signal received from the electronic key ECU 4.

On the door handles 6a to 6e, which are provided for the vehicle doors 11 to 15 respectively, touch sensors 6a1 to 6e1 are installed, respectively. The touch sensors 6a1 to 6e1 are capable of detecting touching one of the door handles 6a to 6e by the holder, respectively. In addition, on the door handles 6a to 6e, door locking switches 6a2 to 6e2 are provided, respectively. The door locking switches 6a2 to 6e2 are each a push switch. When any one of the door locking switches 6a2 to 6e2 is operated, the corresponding one of the vehicle doors 11 to 15 is locked. The door handles 6a to 6e are constructed to also operate as antennas of the compartment external transmitters 6a to 6e, respectively.

It is to be noted that the door locking switch 6e2 for detecting an operation carried out by the holder of the hand-held device 1 on the rear door 15 is not provided at a location in close proximity to the door handle 6e. Instead, it is preferable to provide the door locking switch 6e2 at such a location that the holder of the hand-held device 1 is capable of operating the door locking switch 6e2 even when the rear door 15 is in an open state. In this embodiment, as will be described later, the above sequence of consecutive operations includes an operation to detect a behavior to lock any of the vehicle doors 11 to 15 employed in the vehicle 10 with the vehicle doors 11 to 15 put in an open state, an operation to automatically close the vehicle doors 13 to 15 and an operation to lock the vehicle doors 11 to 15. The behavior to lock any of the vehicle doors 11 to 15 is an operation carried out by the holder of the hand-held device 1 on the corresponding one of the lock switches 6a2 to 6e2. The operation to automatically close the vehicle doors 13 to 15 is an operation to close the vehicle doors 13 to 15, which each have a door opening/closing function. The operation to automatically close the vehicle doors 13 to 15 and the operation to lock the vehicle doors 11 to 15 are carried out consecutively to improve the user friendliness of the vehicle door control system.

It is to be noted that the detector of an operation carried out by the holder of the hand-held device 1 on any one of the vehicle doors 11 to 15 need not be the touch sensors 6a1 to 6e1. For example, a detection mechanism can also be employed as a detector for mechanically detecting an operation to pull out any of the door handles 6a to 6e. As another example, an unlock button is provided on each of the door handles 6a to 6e and an operation carried out on an unlock button provided on any specific one of the door handles 6a to 6e is detected as an operation carried out on the specific door handle. As another alternative, only either the touch sensors 6a1 to 6e1 or the door locking switches 6a2 to 6e2 are provided on the vehicle doors 11 to 15 respectively to serve as both a lock operation section as well as an unlock operation section. As a further alternative, all the vehicle doors 11 to 15 can be set in an unlock standby state when the result of the collation of the ID code is an OK.

In order to enhance the security of the vehicle 10, the vehicle door control system according to this embodiment is also provided with a steering lock ECU 7 and an engine ECU 8. In accordance with a command signal received from the electronic key ECU 4, the steering lock ECU 7 sets or terminates a steering lock state whereas the engine ECU 8 executes control to allow or inhibit an operation to start of the engine employed in the vehicle 10. Processing carried out by the steering lock ECU 7 and the engine ECU 8 is briefly described below.

Control of the steering lock state and control to allow the engine to be started are executed as follows. When the holder of the hand-held device 1 opens one of the vehicle doors 11 to 15 to get on the vehicle 10 and operates an engine switch (not shown) provided in the vehicle 10, the electronic key ECU 4 carries out duplex communications with the hand-held device 1 by using the compartment internal transmitter 2f provided in the compartment of the vehicle 10 and the receiver 3 in order to collate an ID code. In conjunction with the electronic key ECU 4, on the other hand, the steering lock ECU 7 makes sure that the steering lock state can be terminated. Specifically, when the result of the ID code collation is an OK, the electronic key ECU 4 notifies the steering lock ECU 7 that the steering lock state can be terminated. In accordance with the notice received from the electronic key ECU 4, the steering lock ECU 7 terminates the steering lock state. In addition, the electronic key ECU 4 also informs the engine ECU 8 that the inhibition of the operation to start the engine has been terminated by outputting a command signal.

Figure 2:
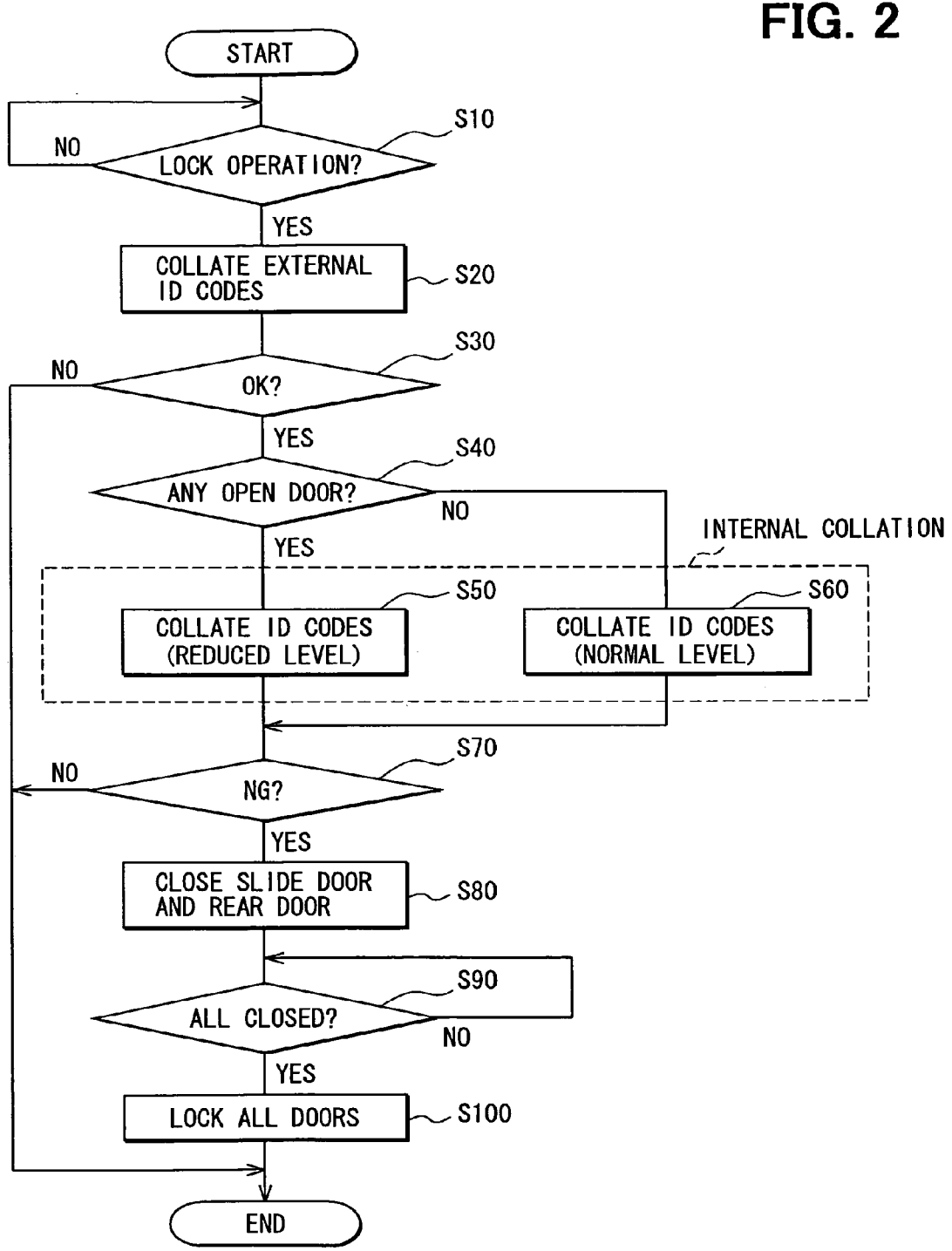
FIG. 2 is a flowchart of processing, which is carried out to implement a sequence of consecutive smart lock operations to automatically close vehicle doors each having a door opening/closing function and then lock all the vehicle doors when an operation carried out by the holder of a hand-held device on any of the vehicle doors is detected.
Figure 3:
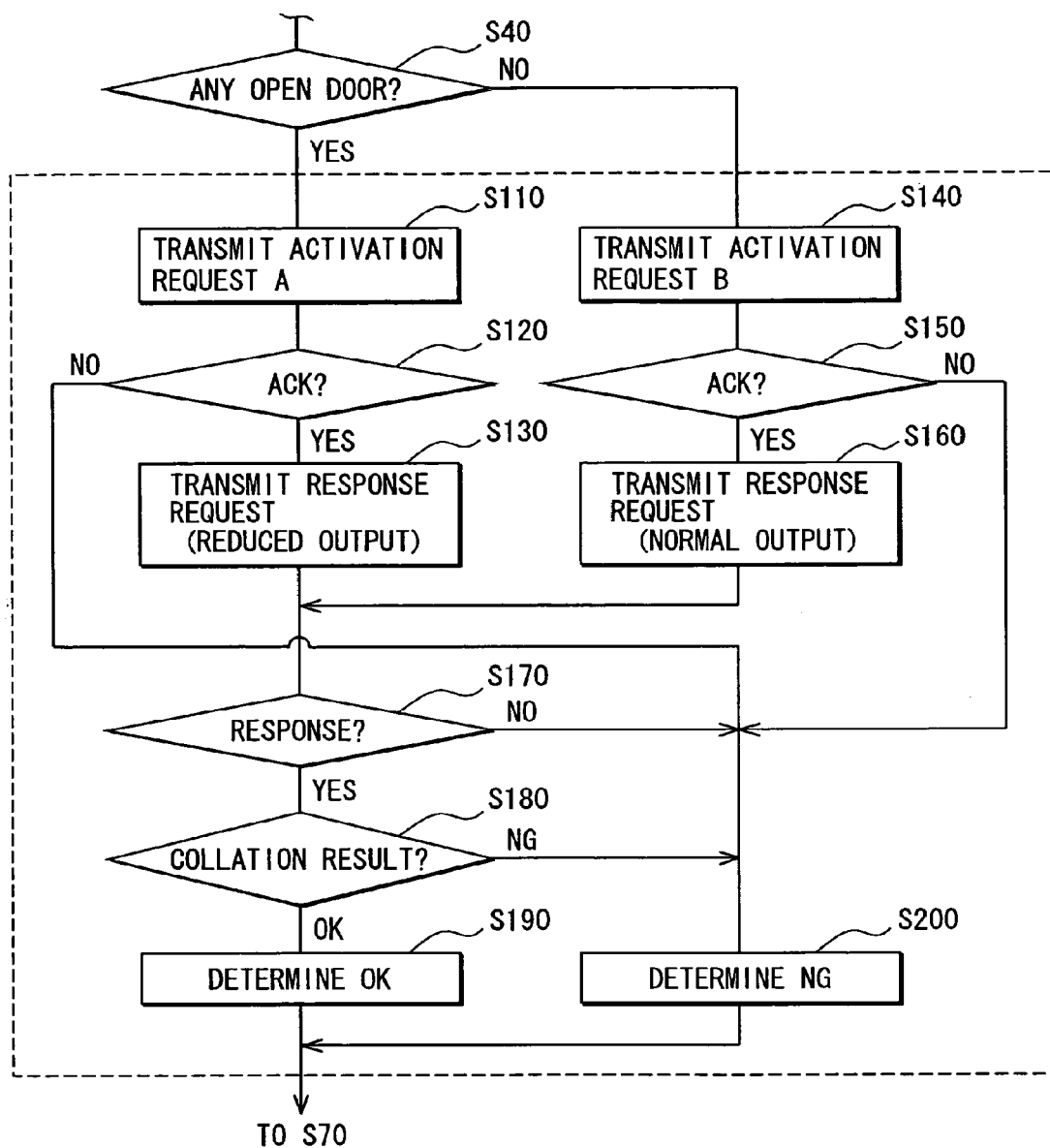
FIG. 3 is a flowchart representing details of processing, which is carried out by a vehicle-side unit employed in the vehicle door control system in order to execute an ID code compartment internal collation process in the processing represented by the flowchart shown in FIG. 2.
Figure 4:
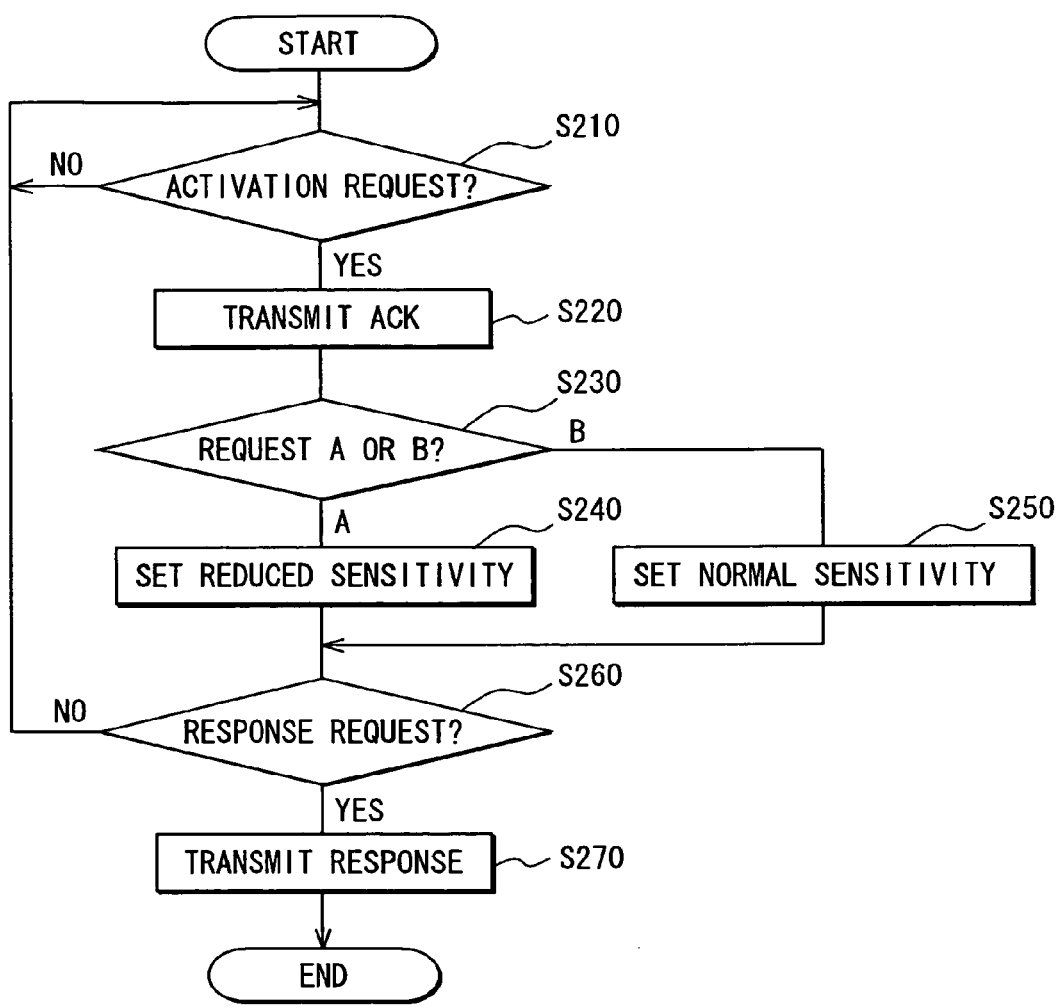
FIG. 4 is a flowchart representing details of processing, which is carried out by the hand-held device in order to execute the ID code compartment internal collation process in the processing represented by the flowchart shown in FIG. 2.

By referring to flowcharts shown in FIGS. 2 to 4, the processing carried out to implement the sequence of consecutive smart lock operations as characteristic processing of the vehicle door control system is described. The characteristic sequence of consecutive smart lock operations comprises an operation to automatically close the vehicle doors 13 to 15, which each have a door opening/closing function, and an operation to lock all the vehicle doors 11 to 15. The characteristic sequence of consecutive operations is triggered by an operation carried out by the holder of the hand-held device 1 on any of the vehicle doors 11 to 15 when the holder of the hand-held device 1 and other passengers get off from the vehicle 10.

The processing shown in FIG. 2 begins with step S10 to produce a result of determination as to whether or not the holder of the hand-held device 1 has carried out a predetermined operation to lock any of the vehicle doors 11 to 15, that is, whether or not the holder of the hand-held device 1 has operated any specific one of the door locking switches 6a2 to 6e2. When the determination result produced at step S10 indicates that the holder of the hand-held device 1 has carried out a predetermined operation to lock any of the vehicle doors 11 to 15, the processing proceeds to step S20. It is also possible to provide a configuration in which, instead of polling for such an operation carried out by the holder of the hand-held device 1 on any of the vehicle doors 11 to 15 at step S10, the event of such an operation can be used as an interrupt to start processes carried out at steps S20 to S100 described as follows.

At step S20, a specific compartment external transmitter 2a, 2b, 2c, 2d or 2e or each of the compartment external transmitters 2a to 2e is requested to transmit a first request signal. The specific compartment external transmitter 2a, 2b, 2c, 2d or 2e is a transmitter provided for a particular door handle 6a, 6b, 6c, 6d or 6e. The particular door handle 6a, 6b, 6c, 6d or 6e is a door handle associated with the specific door locking switch operated by the holder of the hand-held device 1. Then, a response signal is received from the hand-held device 1 as a first response signal transmitted by the hand-held device 1 in response to one of the first request signals. Subsequently, an ID code conveyed by the response signal is collated with an ID code registered in advance in the vehicle-side unit 10a in the compartment external ID code collation process.

Duplex communications between the compartment external transmitter 2a and the hand-held device 1 may be performed as follows. It is to be noted that the other compartment external transmitters 2b to 2e also communicate with the hand-held device 1 in the same manner.

Before the communications are started, the hand-held device 1 is in a sleep state. In this state, the compartment external transmitter 2a transmits an activation request signal to wake up the hand-held device 1 from the sleep state. Waked up by the activation request signal from the sleep state, the hand-held device 1 transmits a first acknowledgment (ACK) signal. When the receiver 3 receives the first ACK signal, the compartment external transmitter 2a transmits a first transmission request signal requesting the hand-held device 1 to transmit a second ACK signal. The first transmission request signal conveys a vehicle ID code peculiar to the vehicle 10. Receiving the first transmission request signal, the hand-held device 1 transmits a second ACK signal when the hand-held device 1 has the same vehicle ID code as the vehicle ID code conveyed by the first transmission request signal.

When the receiver 3 receives the second ACK signal, the compartment external transmitter 2a transmits a second transmission request signal requesting the hand-held device 1 to transmit an ID code. The second transmission request signal conveys a transmitter code peculiar to the compartment external transmitter 2a. The hand-held device 1 creates a response code by using the transmitter code conveyed by the second transmission request signal and transmits a response signal conveying the response code and the requested ID code. It is to be noted that, when the receiver 3 does not receive the first ACK signal transmitted by the hand-held device 1 in response to the activation request signal or the second ACK signal transmitted by the hand-held device 1 in response to the first transmission request signal, the vehicle-side unit 10a assumes that the hand-held device 1 is located outside the communication area. In this case, the communications are ended.

As described above, the hand-held device 1 creates a response code by using a transmitter code, which varies from transmitter to transmitter. Thus, from the response code, the electronic key ECU 4 is capable of recognizing which transmitter has transmitted the second transmission request signal making a request for an ID code conveyed by the response signal received from the hand-held device 1. It is to be noted that, in the above communications, the activation request signal, the first transmission request signal and the second transmission request signal are each a request signal transmitted by a transmitter. On the other hand, the first ACK signal, the second ACK signal and the response signal are each a response signal transmitted by the hand-held device 1.

Instead of using a transmitter code varying from transmitter to transmitter, by shifting the timing with which a transmitter transmits a request signal, from the timing, the electronic key ECU 4 is also capable of recognizing which transmitter has transmitted a second transmission request signal making a request for an ID code conveyed by the response signal received from the hand-held device 1. In addition, it is possible to omit the transmission of the first transmission request signal from the vehicle-side unit 10a and the transmission of the second ACK signal from the hand-held device 1 from the communication procedure described above.

In accordance with the above communication procedure, when the receiver 3 receives a response signal conveying an ID code from the hand-held device 1, the electronic key ECU 4 determines whether or not the ID code conveyed by the response signal satisfies a predetermined relation with an ID code registered in advance in the vehicle-side unit 10a. For example, the electronic key ECU 4 collates the ID code conveyed by the response signal with the ID code registered in advance in the vehicle-side unit 10a in order to determine whether or not the ID codes match each other. When the ID code conveyed by the response signal matches the ID code registered in advance in the vehicle-side unit 10a, the result of the ID code collation is said to be an OK. When the ID code conveyed by the response signal does not match the ID code registered in advance in the vehicle-side unit 10a, on the other hand, the result of the ID code collation is said to be an no good (NG).

Then, the processing proceeds to step S30 to produce a result of determination as to whether the result of the compartment external ID code collation is an OK or an NG on the basis of the ID code collation result produced by the electronic key ECU 4. When the determination result produced in the process carried out at this step indicates that the result of the compartment external ID code collation is an OK, the processing proceeds to step S40. When the determination result produced in the process carried out at this step indicates that the result of the compartment external ID code collation is an NG, on the other hand, the execution of the processing is ended.

At step S40, the electronic key ECU 4 produces a result of determination as to whether or not any of the vehicle doors 11 to 15 are in an open state. When the result of the determination indicates that any of the vehicle doors 11 to 15 are in an open state, the processing proceeds to step S50. At this step, the compartment internal transmitter 2f is driven to transmit a second request signal by reducing the level of the strength of the request signal output by the compartment internal transmitter 2f and the level of the sensitivity of the hand-held device 1 to receive the request signal. When a second response signal is received from the hand-held device 1, an ID code conveyed by the response signal is collated with an ID code registered in advance in the vehicle-side unit 10a in an attempt made to carry out the compartment internal ID code collation process. When the determination result produced at step S40 indicates that the vehicle doors 11 to 15 are each in a closed state, on the other hand, the processing proceeds to step S60. At this step, an attempt is made to carry out a compartment internal ID code collation process similar to that of step S50 except that the level of the strength of the second request signal output by the compartment internal transmitter 2f and the level of the sensitivity of the hand-held device 1 to receive the request signal are sustained as they are.

The attempts are made to carry out the compartment internal ID code collation processes in order to avoid the risk of leaving the hand-held device 1 behind in the compartment of the vehicle 10 with the vehicle doors 11 to 15 locked due to the fact the holder of the hand-held device 1 has forgotten to take along the hand-held device 1 when the holder of the hand-held device 1 gets off from the vehicle 10. When the receiver 3 receives a second response signal transmitted by the hand-held device 1 in response to the second request signal transmitted by the compartment internal transmitter 2f and the result of the compartment internal ID code collation process is determined to be an OK, it is likely that the hand-held device 1 has been left behind in the compartment of the vehicle 10 due to the fact the holder of the hand-held device 1 has forgotten to take along the hand-held device 1 when the holder of the hand-held device 1 gets off from the vehicle 10. For this reason, at next step S70, the electronic key ECU 4 checks the result of the compartment internal ID code collation process in order to determine whether the result is an OK or an NG. When the result of the compartment internal ID code collation process is determined to be an OK, the execution of the processing is ended without carrying out processes at subsequent steps S80 to S100.

When the compartment internal transmitter 2f transmits a request signal with any of the vehicle doors 11 to 15 of the vehicle 10 put in an open state, it is likely that the communication area of the transmitted request signal is extended from the compartment internal area to also cover an area outside the compartment of the vehicle 10 due to the fact that any of the vehicle doors 11 to 15 are in an open state. This phenomenon is explained more by referring to FIGS. 5 and 6. It is to be noted that, in the examples shown in FIGS. 5 and 6, the compartment internal transmitter 2f includes a front-seat compartment internal transmitter having a communication area 2ff covering mainly the front seats and a rear-seat compartment internal transmitter having a communication area 2fr covering mainly the rear seats. In addition, not shown in FIGS. 5 and 6, the front-seat compartment internal transmitter is provided at approximately the center of the communication area covering mainly the front seats and the rear-seat compartment internal transmitter is provided at approximately the center of the communication area covering mainly the rear seats.

Figure 5:
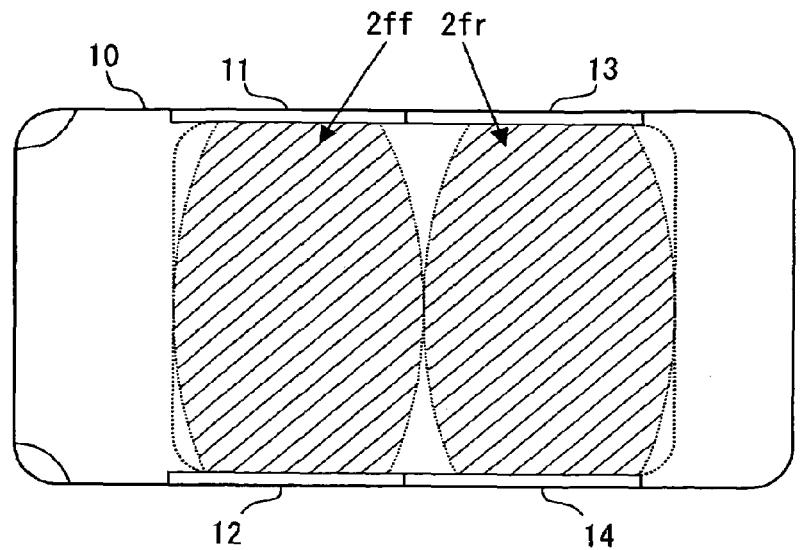
FIG. 5 is a schematic view showing communication areas of compartment internal transmitters with vehicle doors closed.

With the vehicle doors 11 to 15 closed, the vehicle doors 11 to 14 shield a request signal transmitted by the compartment internal transmitter 2f as shown in FIG. 5. Thus, the communication area 2ff and 2fr of the transmitted request signal is prevented from being extended from the compartment internal area to also cover an area outside the compartment of the vehicle 10.

Figure 6:
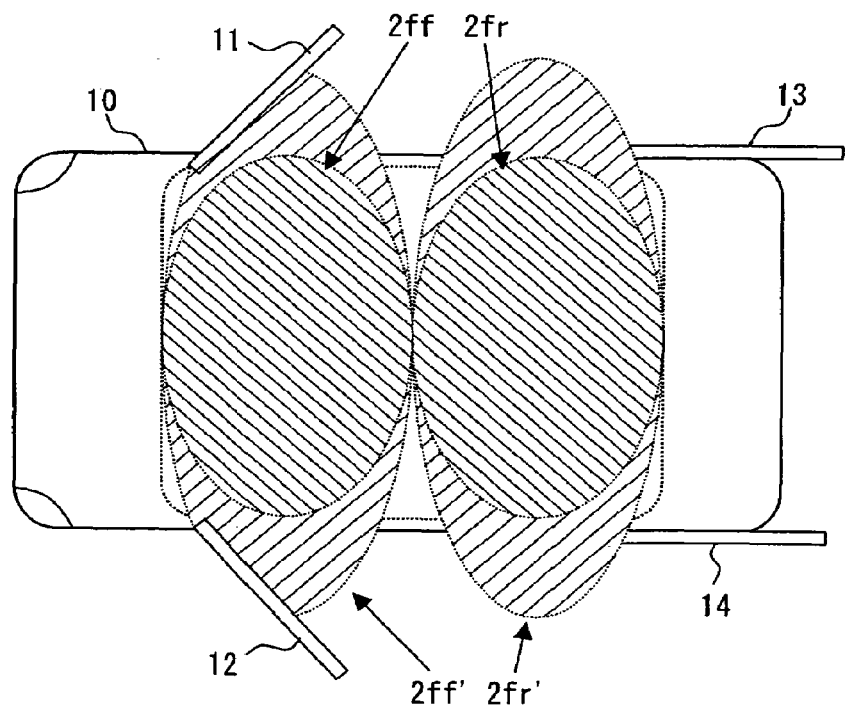
FIG. 6 is a schematic view showing communication areas of compartment internal transmitters with vehicle doors opened.

With the vehicle doors 11 to 14 opened, however, nothing shields a request signal transmitted by the compartment internal transmitter 2f. Thus, the communication area of the transmitted request signal is extended from the compartment internal area 2ff and 2fr to 2ff' and 2fr' to also cover an area outside the compartment of the vehicle 10 as shown in FIG. 6. In this case, a response signal may be received from the hand-held device 1 in response to the request signal transmitted by the compartment internal transmitter 2f in an attempt made to carry out a compartment internal ID code collation process in spite of the fact that the hand-held device 1 is located outside the compartment of the vehicle 10. Since the ECU 4 produces a determination result of OK indicating that the hand-held device 1 has been left behind in the compartment of the vehicle 10 in this case, the execution of the processing is ended. Thus, the sequence of consecutive operations to drive the automatic opening/closing apparatus to automatically close the vehicle doors 13 to 15 each having the door opening/closing function and then lock the vehicle doors 11 to 15 cannot be carried out.

In order to solve the above problem, with any of the vehicle doors 11 to 15 open, the compartment internal transmitter 2f in this embodiment is driven to transmit a request signal by reducing the level of the strength of the request signal output by the compartment internal transmitter 2f and the level of the sensitivity of the hand-held device 1 to receive the request signal in an attempt made to carry out a compartment internal ID code collation process at step S50 as described above. Thus, even with any of the vehicle doors 11 to 15 opened, the communication area of the transmitted request signal is prevented from being extended from the compartment internal area to also cover an area outside the compartment of the vehicle 10 as shown in FIG. 6. As a result, duplex communications between the compartment internal transmitter 2f and the hand-held device 1 cannot be carried out when the hand-held device 1 is located outside the compartment of the vehicle 10 so that the result of the compartment internal ID code collation process becomes an NG.

Then, the processing proceeds to step S70 to determine whether the result of the compartment internal ID code collation process is an OK or an NG. When the result of the compartment internal ID code collation process is an NG, the processing proceeds to step S80 at which the slide-type vehicle doors 13 and 14 each having the door opening/closing function as well as the rear vehicle door 15 also having the door opening/closing function are closed automatically.

Then, the processing proceeds to step S90 to produce a result of determination as to whether or not all the vehicle doors 11 to 15 of the vehicle 10 have been closed. When the result of the determination indicates that all the vehicle doors 11 to 15 have been closed, the processing proceeds to step S100 at which the door locking control sections 5a to 5e are requested to lock the vehicle doors 11 to 15, respectively. In this way, the electronic key ECU 4 locks all the vehicle doors 11 to 15 at the same time only after confirming that all the vehicle doors 11 to 15 have been closed. Thus, the holder of the hand-held device 1 is prevented from forgetting to lock any of the vehicle doors 11 to 15. It is to be noted that, in accordance with a command signal received from the electronic key ECU 4, the steering lock ECU 7 sets a steering lock state whereas the engine ECU 8 executes control to inhibit an operation to start of the engine employed in the vehicle 10 concurrently with the operation to lock the vehicle doors 11 to 15.

In the above processing, when the holder of the hand-held device 1 operates any one of the vehicle doors 11 to 15 in a state where the vehicle doors 13 to 15 each having a door opening/closing function are open, an OK result of an ID code compartment external collation process and an NG result of an ID code compartment internal collation process will lead to execution of a sequence of consecutive operations to automatically close the vehicle doors 13 to 15 and, then, lock all the vehicle doors 11 to 15. Thus, the holder of the hand-held device 1 need not carry out operations to close and lock the vehicle doors at two stages. To be more specific, the holder of the hand-held device 1 does not need to carry out an operation to automatically close the vehicle doors 13 to 15 at a first stage and, then, carry out an operation to lock all the vehicle doors 11 to 15 at a second stage.

The internal collation (S50 and S60) carried out by the vehicle-side unit 10a and the hand-held device 1 is shown in FIGS. 3 and 4. Specifically, when the result of the determination at step S40 indicates that any of the vehicle doors 11 to 15 are in an open state, the processing proceeds to step S110 at which the compartment internal transmitter 2f is requested to transmit an activation request signal A to the hand-held device 1. When the determination result produced at step S40 indicates that the vehicle doors 11 to 15 are each in a closed state, on the other hand, the processing proceeds to step S140 at which the compartment internal transmitter 2f is requested to transmit an activation request signal B to the hand-held device 1. In this way, the compartment internal transmitter 2f transmits one of two kinds of activation request signals in dependence on whether only some of the vehicle doors 11 to 15 or all of the vehicle doors 11 to 15 are in a closed state. This is because, when any of the vehicle doors 11 to 15 are in an open state, the compartment internal transmitter 2f transmits an activation request signal for a low level of the sensitivity of the hand-held device 1 to receive the activation request signal. When the vehicle doors 11 to 15 are each in a closed state, the compartment internal transmitter 2f transmits an activation request signal for a normal level of the sensitivity of the hand-held device 1 to receive the activation request signal.

At step S120, the vehicle-side unit 10a produces a result of determination as to whether or not a first ACK signal has been received as an ACK signal transmitted by the hand-held device 1 in response to the activation request signal A transmitted by the vehicle-side unit 10a at step S110. Similarly, at step S150, the vehicle-side unit 10a produces a result of determination as to whether or not a first ACK signal has been received as an ACK signal transmitted by the hand-held device 1 in response to the activation request signal B transmitted by the vehicle-side unit 10a at step S140. When the determination result produced at step S120 or S150 indicates that a first ACK signal has not been received from the hand-held device 1, the processing proceeds to step S200 at which the result of the ID code compartment internal collation process is determined to be an NG.

When the determination result produced at step S120 indicates that a first ACK signal has been received from the hand-held device 1, on the other hand, the processing proceeds to step S130 at which the compartment internal transmitter 2f transmits first and second transmission request signals sequentially by reducing the levels of the strengths of the request signals output thereby. Similarly, when the determination result produced at step S150 indicates that a first ACK signal has been received from the hand-held device 1, on the other hand, the processing proceeds to step S160 at which the compartment internal transmitter 2f transmits first and second request signals sequentially by sustaining the levels of the strengths of the request signals output thereby at a normal level as they are.

In either case, the processing proceeds to step S170 to produce a result of determination as to whether or not the receiver 3 has received response signals from the hand-held device 1 as response signals transmitted by the hand-held device 1 in response to the first and second transmission request signals transmitted by the compartment internal transmitter 2f at step S130 or S160. When the determination result produced in the process carried out at step S170 indicates that any of the response signals has not been received, the processing proceeds to step S200 at which the result of the ID code compartment internal collation process is determined to be an NG. When the determination result produced in the process carried out at step S170 indicates that all the response signals have been received, on the other hand, the processing proceeds to step S180 at which an ID code conveyed by the response signals is collated with an ID code registered in advance in the vehicle-side unit 10a. When the result of the ID code collation process is an OK, the processing proceeds to step S190 at which the result of the ID code compartment internal collation process is determined to be an OK. When the result of the ID code collation process is an NG, on the other hand, the processing proceeds to step S200 at which the result of the ID code compartment internal collation process is determined to be an NG.

The ID code compartment internal collation processing carried out by the hand-held device 1 begins with step S210 in FIG. 4 to produce a result of determination as to whether or not an activation request signal has been received from the compartment internal transmitter 2f. When the result of the determination indicates that an activation request signal has not been received from the compartment internal transmitter 2f, the determination process of this step is repeated. As a matter of fact, the determination process of this step is carried out repeatedly by execution of only functions required in receiving the activation request signal and in implementing the process till the result of the determination indicates that the activation request signal has been received from the compartment internal transmitter 2f. At this step, other functions of the hand-held device 1 are put in a non-active state or a sleep state.

As the determination result produced at step S210 indicates that an activation request signal has been received from the compartment internal transmitter 2f, the processing proceeds to step S220 at which a first ACK signal is transmitted. Then, the processing proceeds to step S230 to produce a result of determination as to whether the received activation request signal is the signal A or B. When the result of the determination indicates that the received activation request signal is the signal A, the processing proceeds to step S240 at which the sensitivity to receive a request signal is set at a reduced (low) level. The sensitivity to receive a request signal is set at a low level, for example, by decreasing the gain set by the receiver 1a as an amplification degree at which a received activation request signal is amplified. Of course, the sensitivity to receive a request signal can also be set at a low level by adoption of another technique. When the result of the determination indicates that the received activation request signal is the signal B, on the other hand, the processing proceeds to step S250 at which sensitivity to receive a request signal is sustained at a normal level.

In either case, the processing proceeds to step S260 to produce a result of determination as to whether or not the first and second transmission request signals have been received from the compartment internal transmitter 2f. When the determination result produced by this process indicates that the first or second transmission request signal has not been received from the compartment internal transmitter 2f, the processing returns to step S210 to repeat the processes of this and subsequent steps. When the determination result produced by this process indicates that the first and second transmission request signals have been received from the compartment internal transmitter 2f, on the other hand, the processing proceeds to step S270. At step S270, the hand-held device 1 transmits response signals (that is, the second ACK and response signals described before) prior to termination of the execution of the processing.

In the above processing carried out by the vehicle-side unit 10a and the hand-held device 1, when any of the vehicle doors 11 to 15 are in an open state, the compartment internal transmitter 2f and the hand-held device 1 are capable of performing duplex communications at a reduced level of the strength of the request signal output by the compartment internal transmitter 2f and a decreased level of the sensitivity of the hand-held device 1 to receive the request signal. Thus, when the hand-held device 1 is located outside the compartment of the vehicle 10, the ID code compartment internal collation process generates an NG result with a high degree of reliability. As a result, when the holder of the hand-held device 1 operates any of the vehicle doors 11 to 15 from a location outside the compartment of the vehicle 10, it is possible to prevent a decision from being made to erroneously assume that the hand-held device 1 has been left behind in the compartment of the vehicle 10.

The embodiment can be changed to a variety of implementations within a range not deviating from essentials of the present invention.

For example, in the embodiment, after an ID code compartment external collation process, an ID code compartment internal collation process is carried out once. When the result of the ID code compartment internal collation process is an NG, a sequence of consecutive operations is carried out. The consecutive operations start with an operation to automatically close the vehicle doors 13 to 15 and ends with an operation to lock all the vehicle doors 11 to 15.

Figure 7:
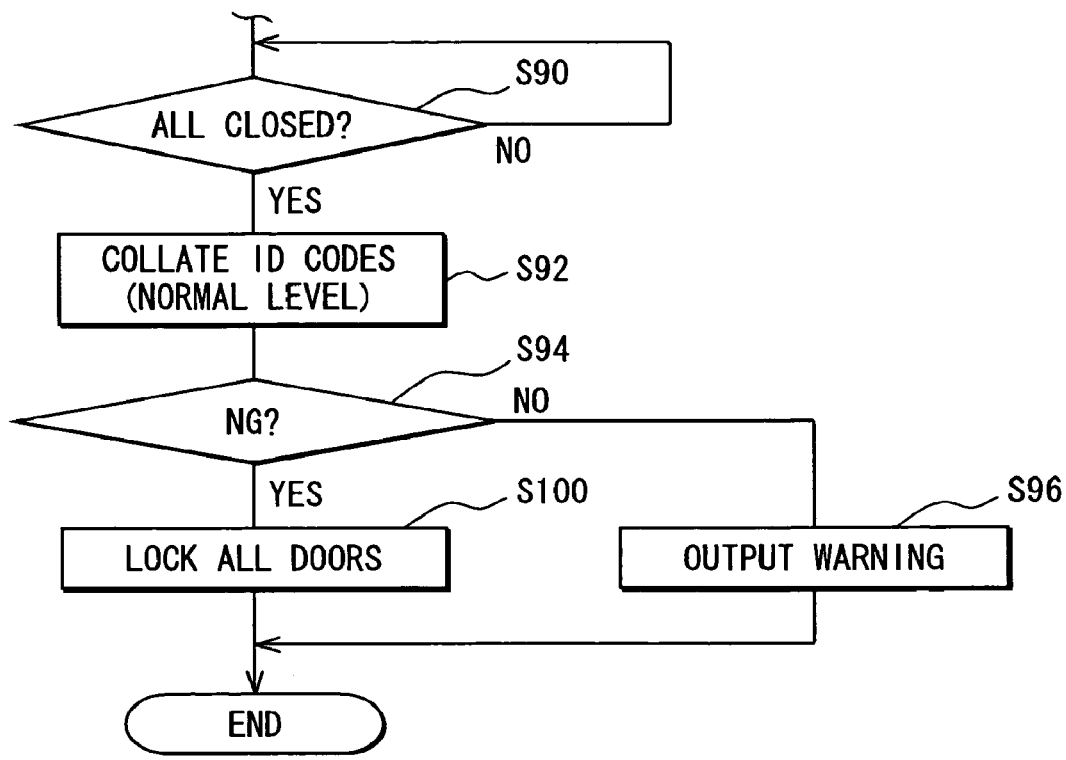
FIG. 7 is a flowchart representing processing according to a modified version of the embodiment.

After the operation to automatically close the vehicle doors 13 to 15 each having the door opening/closing function, however, another ID code compartment internal collation process can also be carried out by setting each of the strength of the request signal output by the vehicle-side unit 10a and the sensitivity of the hand-held device 1 to receive the request signal at a normal level. A processing procedure of this additionally carried out ID code compartment internal collation process is explained by referring to a flowchart shown in FIG. 7. This processing begins with step S90 to produce a result of determination as to whether or not all the vehicle doors 11 to 15 have been closed. As the result of the determination indicates that all the vehicle doors 11 to 15 have been closed, the processing proceeds to step S92 at which an ID code compartment internal collation process is carried out once more. In this ID code compartment internal collation process, the compartment internal transmitter 2f transmits a third request signal, which requests a third response signal from the hand-held device, by setting the strength of the request signal output thereby at a normal level whereas the hand-held device 1 receives the request signal also by setting the sensitivity of the hand-held device 1 to receive the request signal at a normal level.

Then, the processing proceeds to step S94 to produce a result of determination as to whether the result of the ID code compartment internal collation process is an OK or an NG. When the result of the determination process indicates that the result of the ID code compartment internal collation process is an NG, the processing proceeds to step S100 at which all the vehicle doors 11 to 15 are locked. When the result of the determination process indicates that the result of the ID code compartment internal collation process is an OK, on the other hand, the processing proceeds to step S96 to output a warning indicating a possibility of leaving the hand-held device 1 in the compartment of the vehicle 10 due to the fact the holder of the hand-held device 1 has forgotten to take along the hand-held device 1 when the holder of the hand-held device 1 gets off from the vehicle 10.

As described above, after an operation is performed to close all the vehicle doors 11 to 15, another ID code compartment internal collation process is carried out to avoid the risk of leaving the hand-held device 1 in the compartment of the vehicle 10 due to the fact the holder of the hand-held device 1 has forgotten to take along the hand-held device 1 when the holder of the hand-held device 1 gets off from the vehicle 10. When the other ID code compartment internal collation process is carried out by setting each of the strength of the request signal output by the vehicle-side unit 10a and the sensitivity of the hand-held device 1 to receive the request signal at a reduced level, however, the communication area of the compartment internal transmitter 2f does not cover the entire compartment of the vehicle 10. Thus, it is quite likely that a duplex communication cannot be carried out between the compartment internal transmitter 2f and the hand-held device 1 in spite of the fact that the hand-held device 1 is left behind in the compartment of the vehicle 10. Because of that, after an operation is performed to close all the vehicle doors 11 to 15, the other ID code compartment internal collation process is carried out by restoring each of the strength of the request signal output by the vehicle-side unit 10a and the sensitivity of the hand-held device 1 to receive the request signal to a normal level. In this way, when the hand-held device 1 is left behind in the compartment of the vehicle 10, a response signal can be received from the hand-held device 1 with a high degree of reliability.

In addition, in the embodiment, when an ID code compartment internal collation process is carried out with any one of the vehicle doors 11 to 15 put in an open state, the strength of the request signal output by the compartment internal transmitter 2f and the sensitivity of the hand-held device 1 to receive the request signal are each set at a reduced level. As shown in FIGS. 5 and 6, however, the compartment internal transmitter 2f may actually comprise a plurality of compartment internal transmitters, which have communication areas different from each other. In this case, a compartment internal transmitter having a communication area covering an open vehicle door may transmit a request signal by setting each of the strength of the request signal output thereby and the sensitivity of the hand-held device 1 to receive the request signal at a reduced level.

When any of the rear-seat slide doors 13 and 14 are open while the front-seat hinge doors 11 and 12 are each in a closed state, for example, the rear-seat compartment internal transmitter may transmit a request signal by setting each of the strength of the request signal output thereby and the sensitivity of the hand-held device 1 to receive the request signal at a reduced level. When the front-seat compartment internal transmitter also transmits a request signal by setting each of the strength of the request signal output thereby and the sensitivity of the hand-held device 1 to receive the request signal at a reduced level. However, it will be more likely that a duplex communication cannot be carried out between the front-seat compartment internal transmitter and the hand-held device 1 in spite of the fact that the hand-held device 1 is left behind in the compartment of the vehicle 10.

In addition, in the embodiment, by setting each of the strength of the request signal output thereby and the sensitivity of the hand-held device 1 to receive the request signal at a reduced level, it is possible to prevent the communication area of the compartment internal transmitter 2f from being extended to also cover the outside of the compartment of the vehicle 10. By setting at least one of the strength of the request signal output thereby and the sensitivity of the hand-held device 1 to receive the request signal at a reduced level, however, the communication area of the compartment internal transmitter 2f can be narrowed.

In the embodiment, when an operation carried out by the holder of the hand-held device 1 on any one of the vehicle doors 11 to 15 is detected, an operation to automatically close the vehicle doors 13 to 15 each having the door opening/closing function is carried out to be followed by an operation to lock all the vehicle doors 11 to 15. However, when an operation carried out by the holder of the hand-held device 1 on any one of the vehicle doors 11 to 15 is detected, an operation to automatically close all the vehicle doors 11 to 15 may also be carried out to be followed by an operation to lock all the vehicle doors 11 to 15.

Furthermore, in the embodiment, the slide-type doors 13 and 14 as well as the rear door 15 have respectively the driving sections 9c, 9d and 9e each used for carrying out an automatic door opening/closing operation. However, in the same way, a general hinge-type vehicle door may of course have a hinge-door driving section for executing an automatic opening/closing function.

What is claimed is:

1. A vehicle door control system comprising a vehicle-side unit and a hand-held device for controlling vehicle doors in a vehicle in accordance with a result of collation of an ID code, which is conveyed by a response signal transmitted by the hand-held device in response to a request signal transmitted by the vehicle-side unit, with an ID code registered in advance in the vehicle-side unit,
    wherein the vehicle-side unit includes:
    a receiver for receiving the response signal from the hand-held device;
    a compartment external transmitter for transmitting the request signal to an outside of a compartment of the vehicle;
    a compartment internal transmitter for transmitting the request signal to the inside of the compartment of the vehicle;
    a lock state control section for controlling lock and unlock states of the vehicle doors;
    an automatic door opening and closing section capable of automatically carrying out operations to open and close the vehicle doors;
    an operation detection section for detecting a predetermined operation carried out by a holder of the hand-held device on the vehicle doors; and
    a door state control section for controlling the automatic door opening and closing section and the lock state control section to automatically close and lock the vehicle doors, when the operation detection section detects the predetermined operation with at least one vehicle door in an open state and a result of collation of the ID code conveyed in the response signal transmitted by the hand-held device in response to the request signal transmitted by the compartment external transmitter is an OK and no response signal is transmitted by the hand-held device in response to the request signal transmitted by the compartment internal transmitter,
    wherein the door state control section includes a level adjustment section for setting at least one of strength of the request signal transmitted by the compartment internal transmitter and sensitivity of the hand-held device to receive the request signal to levels lower than respective normal levels, when the compartment internal transmitter transmits the request signal with the one vehicle door being in the open state.

2. The vehicle door control system according to claim 1,
    wherein, after the automatic door opening and closing section automatically closes the vehicle doors, the door state control section controls the compartment internal transmitter to again transmit the request signal and controls the lock state control section to lock the vehicle doors after confirming that the response signal of hand-held device in response to the request signal is not received, and
    wherein, when the compartment internal transmitter again transmits the request signal, the level adjustment section restores al least one of the strength of the request signal output by the compartment internal transmitter and the sensitivity of the hand-held device to respective normal levels.

3. The vehicle door control system according to claim 2,
    wherein, when the compartment internal transmitter again transmits the request signal and the response signal is received from the hand-held device, the door state control section issues a warning and controls the lock state control section not to lock the vehicle doors.

4. The vehicle door control system according to claim 1,
    wherein the compartment internal transmitter includes a plurality of transmitter units provided at different positions in the compartment to define respective communication areas, a combination of which covers an entire compartment of the vehicle, and
    wherein, when a part of the transmitter units which defines a communication area corresponding to an open vehicle door transmits the request signal, the level adjustment section sets at least one of the strength of the request signal of only the part of the transmitter units and the sensitivity of the hand-held device to levels lower than respective normal levels.

5. The vehicle door control system according to claim 1,
    wherein the lock state control section determines whether or not all the vehicle doors have been closed and, after confirming that all the vehicle doors have been closed, locks all the vehicle doors at the same time.

6. The vehicle door control system according to claim 5,
    wherein some of the vehicle doors having the automatic opening and closing section are each a door of a slide type.

7. The vehicle door control system according to claim 5,
    wherein one of the vehicle doors has the automatic opening/closing section and serves as a rear door provided at a back portion of the vehicle.

8. The vehicle door control system according to claim 5,
    wherein some of the vehicle doors each having the automatic opening and closing section are each a swing door of a hinge type.

9. A vehicle door control method for a vehicle having a plurality of doors, an external transmitter and an internal transmitter, the method comprising:
    detecting a predetermined operation on a door;
    transmitting a first request signal and a second request signal from the external transmitter to an outside of the vehicle and from the internal transmitter to a compartment of the vehicle, respectively, when the predetermined operation on the door is detected; and performing automatic door control including at least one of door closing and door locking, when a first response signal is received from a hand-held device in response to the first request signal but no second response signal is received from the hand-held device in response to the second request signal, wherein the transmitting step includes checking whether any door of the vehicle is open, and reducing at least one of strength of the second request signal of the internal transmitter and signal receiving sensitivity of the hand-held device when any door is open, thereby preventing the hand-held device from responding to the second request signal.

10. The vehicle door control method according to claim 9, further comprising:

checking whether all the doors are closed;

transmitting a third request signal again from the internal transmitter to the compartment of the vehicle when all the doors are closed by the automatic door control, strength of the third request signal being returned to a normal level higher than a reduced level; and outputting a warning when a third response signal is received from the hand-held device in response to the third request signal without automatically locking all the doors.

* * * * *